3,338,639
EMPTY AND LOAD BRAKE CONTROL
APPARATUS FOR RAILWAY CARS
George E. Carothers, Oakmont, Pa., assignor to Westinghouse Air Brake Company, Wilmerding, Pa., a corporation of Pennsylvania
Filed Oct. 4, 1966, Ser. No. 584,192
7 Claims. (Cl. 303—22)

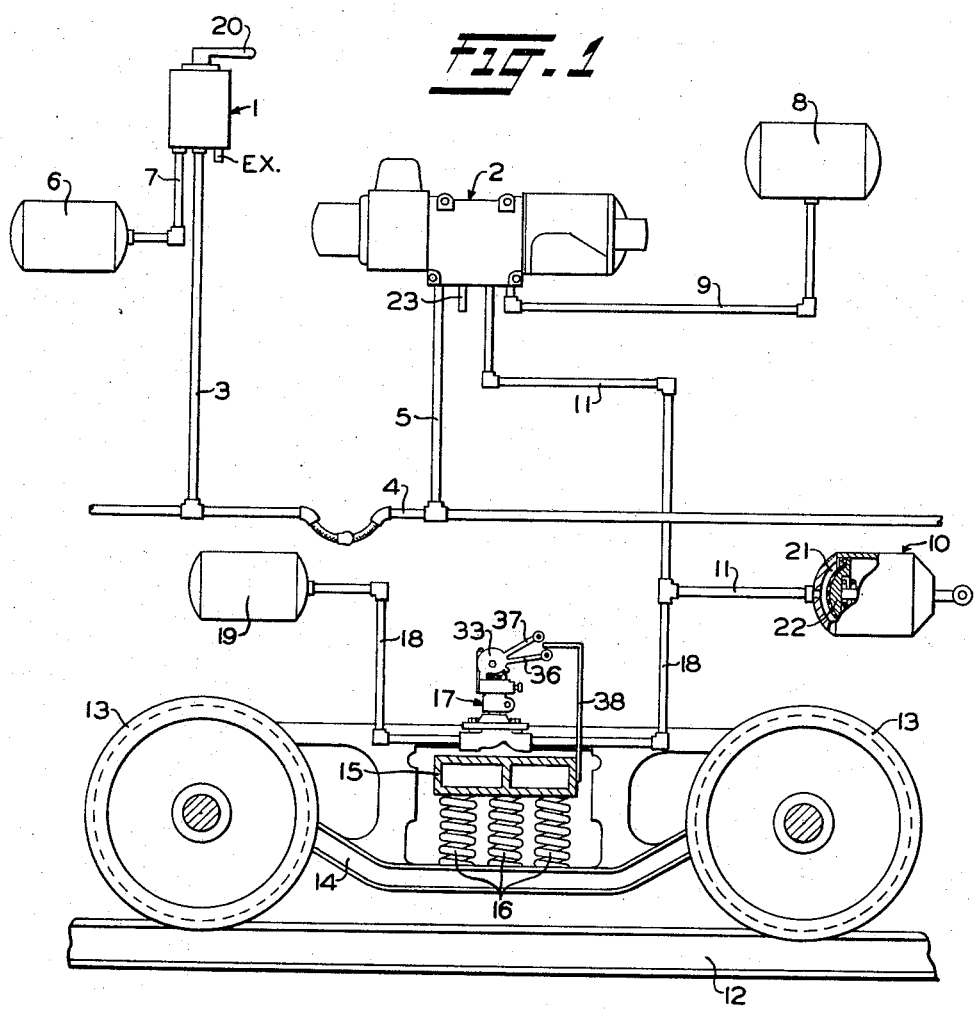
Aug. 29, 1967 — G. E. CAROTHERS — 3,338,639
EMPTY AND LOAD BRAKE CONTROL APPARATUS FOR RAILWAY CARS
Filed Oct. 4, 1966
INVENTOR.
GEORGE E. CAROTHERS
BY Ralph W. McIntire, Jr.
ATTORNEY United States Patent Office 3,338,639
Patented Aug. 29, 1967

ABSTRACT OF THE DISCLOSURE

Empty and load brake control apparatus for varying the degree of brake application on a railway vehicle in accordance with an "empty" or "load" condition thereof, said apparatus comprising a two-position valve device for either connecting the brake cylinder pressure chamber to or isolating it from a supplemental volume for correspondingly affecting the degree of pressure established in the brake cylinder. Changeover of the valve device from "empty" position to "load" position and vice versa is effected at a certain percentage of full load through a lost-motion cam and strut arrangement actuated according to the amount of truck spring deflection caused by the vehicle load.

---

Many types of so-called "empty and load" brake control apparatus have been heretofore known and used for automatically reducing the degree of braking on railway cars carrying a relatively light load as compared to cars carrying a relatively heavy load, for the purpose of avoiding excessive braking on the wheels of relatively lightly loaded cars and consequent possible sliding of the wheels. Sliding of the wheels of a railway car is objectionable because of the resultant development of flat spots on the wheel treads and the high maintenance cost of turning the wheels to remove the flat spots.

Heretofore known types of empty and load brake control apparatus usually comprise a so-called change-over valve device and a strut cylinder, the latter being a device for measuring the degree of load carried on a car according to the relative heights of sprung and unsprung parts of a car or car truck. Such heretofore known types of empty and load brake control apparatus have been relatively complicated in nature and relatively high in cost.

The object of the present invention, therefore, is to provide improved empty and load brake control apparatus of the type utilizing means responsive to the relative heights of the sprung and unsprung portions of the vehicle, reflecting the degree of load carried by the vehicle, for controlling and effecting a degree of brake application commensurate with the load, said brake control apparatus being characterized by simplicity of structure, reliability of operation and low production cost.

Briefly, the invention comprises a compensating volume which is selectively connected with or disconnected from the brake cylinder pressure chamber under control of a simple valve device mounted on an unsprung portion of the vehicle or car truck, which valve device is operated by a snap-acting mechanism to one position for connecting the compensating volume to the brake cylinder pressure chamber or to another position for disconnecting the compensating volume from the brake cylinder. The snap-acting mechanism is actuated by an operating lever fixed to the sprung portion of the vehicle and thereby movable with said sprung portion in accordance with any changes in vehicle load. The snap-acting mechanism includes a pair of angularly spaced radial arms for operating the valve device when one or the other of said arms is engaged and moved by the operating lever carried by the sprung portion, said radial arms and operating lever being so disposed relative to each other that the operating lever is not in contact with said arms other than when the changeover of the valve device from one position to the other is effected at approximately a certain percent of full load carried on the car. Inadvertent undesired operation of the valve device due to bouncing of the vehicle, is thereby avoided. It will be understood that the pressure of equalization in the brake cylinder, resulting from supply of fluid under pressure from the auxiliary reservoir on the car, incidental to a brake application is of course less when the compensating volume is connected to, that is added to, the brake cylinder pressure chamber volume, than when it is disconnected therefrom. As more fully described hereinafter, the arrangement is such as to effect a changeover from the relatively higher brake cylinder pressure characteristic of "full" load to a relatively lower brake cylinder pressure whenever the load on the car reduces to a certain percent, such as twenty percent, of the full load on the car. Moreover the arrangement is of such simplicity that it is not necessary to effect an emergency brake application to cause changeover operation of the empty and load apparatus.

In the drawing, FIG. 1 shows a schematic arrangement of the brake apparatus embodying the invention; and FIG. 2 is an elevational view, in section and on a larger scale, of a portion of the apparatus shown in FIG. 1.

Description and operation

The empty and load brake apparatus, as shown in FIG. 1, comprises an operator's automatic brake valve device 1 normally mounted in the locomotive cab (not shown), a brake control valve device 2 mounted on the railway car (not shown), said automatic brake valve device being connected via a fluid pressure conduit or pipe 3 to a brake pipe 4, which is normally charged with fluid pressure at a preselected valve and which is connected to said brake control valve device via a branch conduit or pipe 5. The brake apparatus further comprises a fluid pressure or main reservoir 6 connected by a fluid conduit or pipe 7 to the automatic brake valve device 1, an auxiliary reservoir 8 connected to the brake control valve device 2 via a pipe or conduit 9, and a brake cylinder device 10 carried on the car and adapted to be connected in the usual manner with brake rigging (not shown), said brake cylinder device being connected to said brake control valve device via a pressure conduit or pipe 11.

Also shown in FIG. 1 is a rail 12 on which a portion of a railway truck is shown resting, said railway truck comprising a pair of wheel and axle assemblies having wheels 13 rotatably mounted in usual manner in bearing housings on a truck side frame 14, which hereinafter will also be referred to as an "unsprung portion" of the vehicle or car. The car body (not shown) is resiliently supported by a bolster member 15 disposed transversely on the car truck with each end resiliently supported by respective pluralities of coil springs 16, only one set of said springs being shown, said bolster member to be hereinafter referred to as the "sprung portion" of the vehicle.

According to the invention, a two-position diaphragm type change-over valve device 17 is removably carried by the side frame 13 in a convenient location and is interposed in a fluid pressure conduit or pipe 18 having one end connected to a reservoir or compensating volume 19 and the other end connected to pipe 11, for a purpose to be hereinafter disclosed.

The several components consisting of the operator's automatic brake valve device 1, the brake control valve device 2, the brake pipe 4, the auxiliary reservoir 8 and the brake cylinder device 10 comprise a basic well-known type of fluid pressure operable brake apparatus, and since such apparatus is well-known to those skilled in the art and a comprehensive description thereof is not deemed essential to an understanding of the invention, only a very brief description, as follows, will be given of said several components.

The operator's automatic brake valve device 1, shown diagrammatically in FIG. 1 of the drawing, is provided with an operating handle 20 manipulation of which, in well-known manner, effects a reduction from the normally charged fluid pressure in the brake pipe 4 via the exhaust port identified as Ex which reduction, in turn, causes operation of the brake control valve device 2 to connect fluid under pressure from the auxiliary reservoir 8, via conduits 9 and 11, to a pressure chamber 21 of the brake cylinder device 10 to effect equalization of such pressure therebetween. With fluid pressure in chamber 21, a piston 22 is actuated to cause a brake application corresponding to the degree of reduction in brake pipe pressure (as determined by the position in which the handle 20 is set) to be applied to the wheels 13. Operation of the operator's handle 20 and, therefore, of the automatic brake valve device 1 to a release position effects a connection, via conduit 7 between the main reservoir 6 and brake pipe 4 to thereby restore fluid pressure in the brake pipe 4 to its preselected normal valve and cause the brake control valve device 2 to effect a release of the brake application by venting fluid pressure from the pressure chamber 21 of the brake cylinder device 10 via conduit 11 and an atmospheric vent 23 in the brake control valve device 2.

The change-over valve device 17 comprises a casing consisting of an upper portion 24, as viewed in FIG. 2 of the drawing, and a lower portion 25 with a resilient diaphragm type valve member 26 clamped at its outer periphery between said two casing portions. The lower casing section 25 has two passageways 27 and 28 formed therein, one end of each said passageways being connected to respective portions of the conduit 18, while the respective other ends of said passageways open to a common valve chamber 29 via which said passageways communicate with each other, as will presently be described.

Due to the resilient nature of the diaphragm valve 26 and to its disposition between the two casing portions 24 and 25 relative to the opening of passageway 27 into valve chamber 29, said diaphragm, when in an unstressed state, occupies an open or unseated position in which it is unseated from an annular valve seat 30 surrounding said opening of said passageway. A valve stem 31 is coaxially and slidably disposed in the upper casing portion 24, and, when moved downwardly, as viewed in the drawing, acts through a diaphragm follower 32 to cause the diaphragm valve 26 to be stressed out of its unseated position to a closed or seated position in which it is seated on the valve seat 30 to thereby cut off communication between passageways 27 and 28 via valve chamber 29.

Also in accordance with the invention, a snap-acting type mechanism for effecting operation of the diaphragm is mounted on the upper casing portion 24 and comprises a cam member 33 rotatably mounted on an axis perpendicular to that of the valve stem 31. The cam member 33 has formed on the periphery thereof two angularly spaced flat cam surfaces 34 and 35, the former being disposed at a lesser radial distance from the axis of rotation than the latter. Rotation of the cam member 33 is effected by lever means comprising a pair of angularly spaced radial arms 36 and 37 extending radially from said cam member into the path of movement of operating lever 38. As may be seen in FIG. 1, the operating lever 38 is fixed to the bolster member 15 for vertical movement therewith, such as when the load on the car is altered to cause a corresponding vertical adjustment of said bolster member according to the change in load. A vertically disposed portion 39 of lever 38 extends upwardly from the bolster member 15, as viewed in FIG. 1, and terminates at its upper extremity with a horizontally extending portion or finger 40 of such length as to project between and be engageable with one or the other of two rollers 41 and 42 carried on the ends of the radial arms 36 and 37, respectively, when said toggle arms and fingers are in a certain positional relationship, as will be more fully explained hereinafter.

The snap action of the snap-acting mechanism is effected by a spring arrangement consisting of a flat leaf type spring 43 anchored at one end to the casing portion 24 with its free end arranged to bear, with a biasing action, against one or the other of two angularly spaced flat surfaces 44 and 45 peripherally disposed on a spring-deflecting member 46 coaxially rotatable with the cam member 33. The juncture or intersection of the two flat surfaces 44 and 45 forms an apex 47, which rides against the leaf spring 43, when the cam member 33 and spring-deflecting member 46 are rotated either in a clockwise or counterclockwise direction, to cause said spring-deflecting member and, therefore, said cam member to be moved to one position or the other with a snap-action, as will presently be described. As shown in FIG. 2, a stop 48, formed on the cam member 33, is adapted to abut against casing portion 24 and thereby limit counterclockwise rotation of said cam member and, therefore, of said spring-deflecting member 46 to a valve-opening position in which the flat surface 44 is in contact with the leaf spring 43, and cam surface 34 is in contact with the upper end of stem 31, whereby valve 26 is in its unseated or open position above defined. A stop 49 limits clockwise rotation of cam 33 and spring-deflecting member 46 to a valve-closing position in which the flat surface 45 is in contact with leaf spring 43, and cam surface 35 is in contact with stem 31, whereby valve 26 is caused to occupy its seated or closed position, above defined.

In operation, the load condition of the vehicle determines the setting of the change-over valve device 17, that is, whether the valve 26 is in its seated or unseated position relative to the valve seat 30. With the vehicle completely empty, the springs 16 are compressed a minimum amount and the operating lever 38, therefore, is in an uppermost or what may be called an empty-car position, in which it is shown in solid line in FIG. 2, with the finger 40 projecting between the rollers 41 and 42 of radial arms 36 and 37 but not in contact with ether one. Since the radial arms 36 and 37, the cam member 33, and the spring-deflecting member 46 comprising the snap-acting mechanism are all rotatable together as a unit, said unit, with said arms in the position shown in FIG. 2, may be said to occupy a valve-opening position, hereinbefore described in connection with said cam and spring-deflecting members and in which position the valve 26 is unseated from valve seat 20.

With valve 26 in its unseated position, communication through pipe 18 is open to thereby connect, through said pipe, the compensating volume 19 to the pressure chamber 21 of the brake cylinder device 10. Thus, if a brake application is initiated by the operator in the manner above described, a portion of the pressurized fluid which would normally be equalized between the auxiliary reservoir 8 and the brake cylinder device 10 only, is diverted to or equalized in the compensating volume 19, also, which results in reducing the degree of brake application to what may be called an empty-car application as determined by the preselected capacity of said volume. If, as a result of the empty-car application, the empty car is merely slowed down or if it is brought to a complete stop, during which time the empty-car condition remains unchanged, a release of the brake application, as above described, effects venting of fluid pressure in the compensating reservoir 19, along with that in pressure chamber 21 in the brake cylinder device 10 via pipes 18 and 11, the brake control valve device 2 and the vent port 23.

On the other hand, if the load situation on an empty-car, which has been brought to a stop, is changed by increasing the load on the car while it is sitting still with an empty-car brake application in effect and, therefore, with fluid pressure prevailing in the compensating reservoir 19, the added load will cause further compression of the springs 16 and, therefore, downward movement of the bolster 15 and the operating lever 38, as viewed in FIG. 1. Downward movement of lever 38 causes clockwise rotation of the radial arms 36 and 37 and thereby seating of valve 26 on the seat 30 in a manner to be described in greater detail hereinafter. Thus with valve 26 operated to its seated position while fluid pressure prevails in the compensating reservoir 19, said compensating reservoir is isolated and such fluid pressure becomes trapped therein (notwithstanding the fact that the brake application may be released thereafter in order to move the car) until the vehicle load is lightened sufficiently to cause operation of the change-over valve device 17 to unseat valve 26 and a brake release is effected subsequently thereto, as will later be explained. Entrapment of fluid pressure in the compensating reservoir 19, however, does not cause any undesirable effects with respect to the operation of the invention as intended. With the valve 26 in its seated or closed position, the compensating reservoir 19 is isolated and, therefore, whether void of fluid pressure or charged with fluid pressure trapped therein, has no effect under such conditions in reducing the effectiveness of fluid pressure supplied to the brake cylinder device 10 for effecting a brake application, which may be called a loaded-car application.

As shown in FIG. 2, the snap-acting mechanism for operating the change-over valve device 17 is illustrated as effecting the operation of said change-over valve device at a 20% load condition of the car, it being understood, however, that said 20% load condition at which operation or changeover of said valve device occurs is purely arbitrary for the purpose of explaining the operation of the invention, and that the mechanism could be designed to operate at any degree of load condition by proper setting of the toggle arms 36 and 37 relative to the lever 38. When an empty car is being loaded, the finger 40 of operating lever 38, in moving downwardly with the bolster 15, engages the roller 41 on the radial arm 36 at some point in advance of the attainment of the 20% load on the car and moves said radial arm downwardly along with it so as to cause clockwise rotation of the cam member 33 and the spring-deflecting member 46. As the spring-deflecting member 46 is rotated, the apex 47 stresses the spring 43 so as to cause it to be deflected off surface 44. As the continued rotation of the spring-deflecting member 46 causes the apex 47 to pass over a center position or point of maximum spring deflection, which is set to coincide with the degree of load (in this case, 20%) at which change-over operation is selected to occur, the energy build-up in deflected spring 43, acting through said spring-deflecting member causes it, along with cam member 33 and radial arms 36 and 37, to move as a unit and with a snap-action toward its valve-closing position, above defined, in which the cam surface 35 (having the greater radius) engages the stem 31 to cause seating of valve 26 on seat 30 and thereby isolate compensating volume 19 from the brake cylinder device 10 to effect maximum braking effort commensurate with the degree of fluid pressure supplied to said brake cylinder device.

When the apex 47 passes over the center position or point of maximum spring deflection, above noted, to cause the snap-action of the snap-acting mechanism, the roller 41 is moved out of contact with the under side of finger 40, as viewed in FIG. 2, and roller 42 moves into contact with the upper side of said finger. At this point it should be noted that, even if no further loading of the vehicle occurs and the roller 42, therefore, remains in contact with the finger 40, bouncing of the vehicle and of the operating lever 38 while the car is in motion will not be effective for causing changeover operation or shifting of the snap-acting mechanism back to its valve-opening position (above defined), because the bouncing must be so pronounced as to produce an amount of counterclockwise rotation of the radial arm 37 and of the spring-deflecting member 46 against the biasing action of spring 43 as to cause the apex 47 of said spring-deflecting member to pass back through the point of maximum spring deflection, which possibility is very remote. Thus, the novel arrangement of a snap-action mechanism operatively interposed between the sprung portion 15 and the unsprung portion 14 for operating the change-over valve device 17, as opposed to the type of arrangements described earlier herein, prevents untimely and undesirable change-over operation of said change-over valve device.

If loading of the vehicle continues beyond the 20% point until the vehicle is completely loaded, for example, the bolster 15 and, therefore, the finger 40 of lever 38 continues to move downwardly until said finger occupies a position completely out of contact with either of the rollers 41 and 42, the respective positions of said finger and said rollers being shown in broken outline in FIG. 2. With finger 40 completely out of contact with either of the rollers 41 and 42, the radial arms 36 and 37, the cam member 33 and the spring-deflecting member 46 rotate in a counterclockwise direction to the limit permitted by engagement of the stop 49 with the casing, whereupon the leaf spring 43 rests squarely on flat surface 44 of said spring-deflecting member. It should be apparent that in the last-described positional relationship between the rollers 41 and 42 and the finger 40, wherein they are completely out of contact with each other, there is no possibility of inadvertent operation of the changeover valve device 17 due to bouncing of the vehicle while in motion.

Of course, unloading of the vehicle causes the finger 40 of the operating lever 38 to move upwardly, as viewed in FIG. 2, and, before reaching a position corresponding to the 20% load contacts the roller 42 at the position, in which it is shown in broken outline in FIG. 2, to thereby rotate the radial arms 36 and 37, the spring-deflecting member 46 and the cam member 33 in a counterclockwise direction as said finger continues to move upwardly. If the vehicle is unloaded to the 20% point or lower, the apex 47 of the spring deflecting member 46 is carried over the maximum spring-deflection point and thereby, along with the arms 36 and 37 and the cam member 33, is forced by the deflected spring with a snap-action, to its valve-opening position, above defined, in which valve 26 is unseated from seat 30 to thereby communicate compensating reservoir 19 with the brake cylinder device 10 and effect any subsequent brake application accordingly.

Again it should be noted that in the position corresponding to a completely empty car, the finger 40, as shown in solid outline, in FIG. 2, is completely out of contact with either of the rollers 41 and 42 so as to eliminate the possibility of inadvertent operation of the change-over valve device 17 due to bouncing of the vehicle while in motion. Thus, a lost-motion connection is provided between the lever 38 (in effect, the sprung portion 15) and the radial arms 36 and 37 (in effect, the unsprung portion 14) on both sides of the change-over position (in this case 20% load) for preventing untimely operation of the change-over valve device 17.

Having now described the invention, what I claim as new and desire to secure the Letters Patent, is:

1. An empty and load brake control apparatus for a railway vehicle having sprung and unsprung portions, said brake control apparatus comprising the combination of:
 (a) brake cylinder means having a pressure chamber to which fluid under pressure is supplied to effect a brake application and from which fluid under pressure is released to effect a brake release,
 (b) a volume reservoir,
 (c) valve means for selectively connecting said volume reservoir to and disconnecting it from said pressure chamber to provide a lesser or greater pressure of equalization therein and thereby provide correspondingly different degrees of braking, said valve means comprising:
 (i) a diaphragm element, (ii) an operating stem by which the diaphragm valve element is actuated to and held in a closed position in which said volume reservoir is disconnected from said pressure chamber, and (iii) rotary cam means engaging said stem for shifting it in one direction to close the diaphragm valve element and for releasing the pressure on on said stem to cause the diaphragm valve element to move to an open position in which said volume reservoir is connected to said pressure chamber, and (d) a linearly movable member having a lost motion connection to said cam means, said member being movable proportionally to the relative distance between the sprung and unsprung portions of the vehicle and being effective to cause rotation of the cam means to effect a changeover of the diaphragm valve element from either of its two positions to the other upon an increase and decrease, respectively, with respect to a predetermined percentage of full load on the vehicle.

2. Empty and load brake control apparatus for a railway vehicle having sprung and unsprung portions, said brake control apparatus comprising, in combination:

(a) brake cylinder means having a pressure chamber to which fluid under pressure is supplied to effect a brake application, (b) a volume reservoir, (c) valve means operative selectively to either one of two positions, in one of which it establishes a communication between said volume reservoir and the pressure chamber of the brake cylinder means and in the other of which it closes said communication, (d) linearly movable means actuable proportionally to relative motion of the sprung and unsprung portions of the vehicle incident to change in the load on the vehicle, (e) rotary cam means for operating said valve means, said cam means having one position in which the valve means is in its said one position and another position in which said valve means is in its said other position, (f) resilient means yieldingly resisting rotation of said rotary cam means out of either its said two positions toward the other and effective upon rotation of the rotary cam means through only a portion of the angle between the two positions for biasing it to the other position, and (g) lever means with which said linearly movable means cooperates to effect rotation of said cam means.

3. In an empty and load brake control apparatus for use on a railway vehicle having a brake cylinder device operable responsively to fluid supplied to a pressure chamber therein at a selected degree of pressure for effecting a brake application on the vehicle and having sprung and unsprung portions positionally disposed relative to each other according to the degree of load on the vehicle, the combination of:

(a) a compensating reservoir communicable with the pressure chamber of the brake cylinder device, (b) valve means carried by the unsprung portion of the vehicle, said valve means being operable to an open position, in which said reservoir is in communication with the pressure chamber of the brake cylinder, or to a closed position in which said reservoir is isolated from the pressure chamber, (c) a snap-acting mechanism having a first position and a second position for effecting operation of said valve means to its said open and closed positions respectively, and (d) lever means carried by and movable with the sprung portion of the vehicle, said lever means being effective at at a certain positional relationship between the sprung and unsprung portions corresponding to a certain preselected degree of vehicle load for effecting operation of said snap-acting mechanism from its said first position to its said second position, or reversely, in response to an increase or decrease, respectively, in vehicle load beyond said certain preselected degree, whereby said compensating reservoir is isolated from or communicated with the brake cylinder pressure chamber for influencing a subsequent brake application accordingly.

4. The combination set forth in claim 3 wherein said snap-acting means includes means for providing a lost-motion relationship between said lever means and said snap-acting means for delaying operation of said valve means from one of its said positions to the other and vice versa until the certain preselected degree of vehicle load has been attained.

5. The combination set forth in claim 3 wherein said snap-acting means comprises:

(a) a cam member operatively associated with said valve means and rotatable in one direction to one position for causing said valve means to be operated to its said open position and rotatable in an opposite direction to a different position for causing operation of said valve means to its said closed position, (b) a pair of angularly spaced radial arms extending radially from said cam member into the path of movement of said lever means one of said arms being engageable by said lever means during movement thereof in one direction caused by increasing the vehicle load for effecting operation of the cam member to its said one position, while the other of said arms is engageable by said lever means during movement thereof in an opposite direction caused by decreasing the vehicle load for effecting operation of said cam member to its said different position, and (c) biasing means operatively associated with said cam member and said radial arms, said biasing means being effective, when said sprung and unsprung portions occupy said certain positional relationship, for causing said cam member and said radial arms to be moved to said one position or said different position, depending upon the direction of movement of said lever means, with a snap action.

6. An empty and load brake control apparatus for use on a railway vehicle having sprung and unsprung portions positionally adjustable relative to each other in accordance with the degree of vehicle load, said apparatus comprising, in combination:

(a) a brake cylinder device operable responsively to fluid supplied to a pressure chamber therein at a selected pressure for effecting a brake application on the vehicle and to release of such pressurized fluid for effecting a release of said brake application, (b) a compensating reservoir, (c) a conduit connecting said reservoir to said brake cylinder pressure chamber, (d) a valve device adapted to be mounted on the unsprung portion of the vehicle and interposed in said conduit between said brake cylinder device pressure chamber and said compensating reservoir for controlling communication through said conduit, (e) a valve member operably disposed in said valve device, said valve member having an open position in which said compensating reservoir is placed in communication with said pressure chamber via said conduit and being operable to a closed position in which such communication is cut off, (f) a snap-acting mechanism operatively associated with said valve device for operating said valve member, said snap-acting mechanism comprising:

(i) an operating member carried by said valve device and being rotatable in one direction out of a center position to a first position, in which said valve member is operated to its said open position, and being rotatable in a direction opposite to said one direction out of said center position to a second position in which said valve member is operated to its said closed position, (ii) a spring member carried on said valve device and stressed by rotation of said operating member out of one of its said first or its second positions through said center position, the return force of the stressed spring member being effective for moving said operating member to the other of its said first and second positions with a snap action, and (g) an operating lever adapted to be carried by and moveable with the sprung portion of the vehicle, said operating lever being so disposed as to engage said operating member for effecting movement thereof from its said first position through said center position upon loading of the vehicle in excess of a certain degree of load capacity and for effecting movement of said operating member from its said second position through said center position upon unloading of the vehicle to a degree less than said certain degree.

7. The combination as set forth in claim 6 further characterized in that said operating lever is so arranged relative to said operating member as to provide a preselected amount of lost motion therebetween for delaying engagement of the lever with the member and consequent operation of the latter through its said center position until the loading or unloading of the vehicle has reached said certain degree of load capacity.

References Cited
FOREIGN PATENTS 602,382   5/1948   Great Britain.

EUGENE G. BOTZ, *Primary Examiner.*